United States Patent [19]
Bianchetta

[11] 3,759,357
[45] Sept. 18, 1973

[54] BRAKE SAVER CIRCUIT
[75] Inventor: Donald L. Bianchetta, Coal City, Ill.
[73] Assignee: Caterpillar Tractor Co., Peoria, Ill.
[22] Filed: Mar. 23, 1972
[21] Appl. No.: 237,349

[52] U.S. Cl. .................................. 192/3 R, 188/170
[51] Int. Cl. ............................................ B60k 29/02
[58] Field of Search .................. 192/3 R, 4 C, 3 TR

[56] References Cited
UNITED STATES PATENTS
3,439,579   4/1969   Guinot ............................. 192/3 R X
2,171,204   8/1939   Vickers .............................. 192/3 R Primary Examiner—Benjamin W. Wyche
Attorney—Freling Baker et al.

[57] ABSTRACT

There is disclosed a brake control system in conjunction with drive control system of a vehicle wherein said systems are interconnected for simultaneous release of spring applied brakes upon activation of the drive control circuit, providing control pressure is adequate for full release of the brakes.

4 Claims, 1 Drawing Figure

Patented Sept. 18, 1973 3,759,357
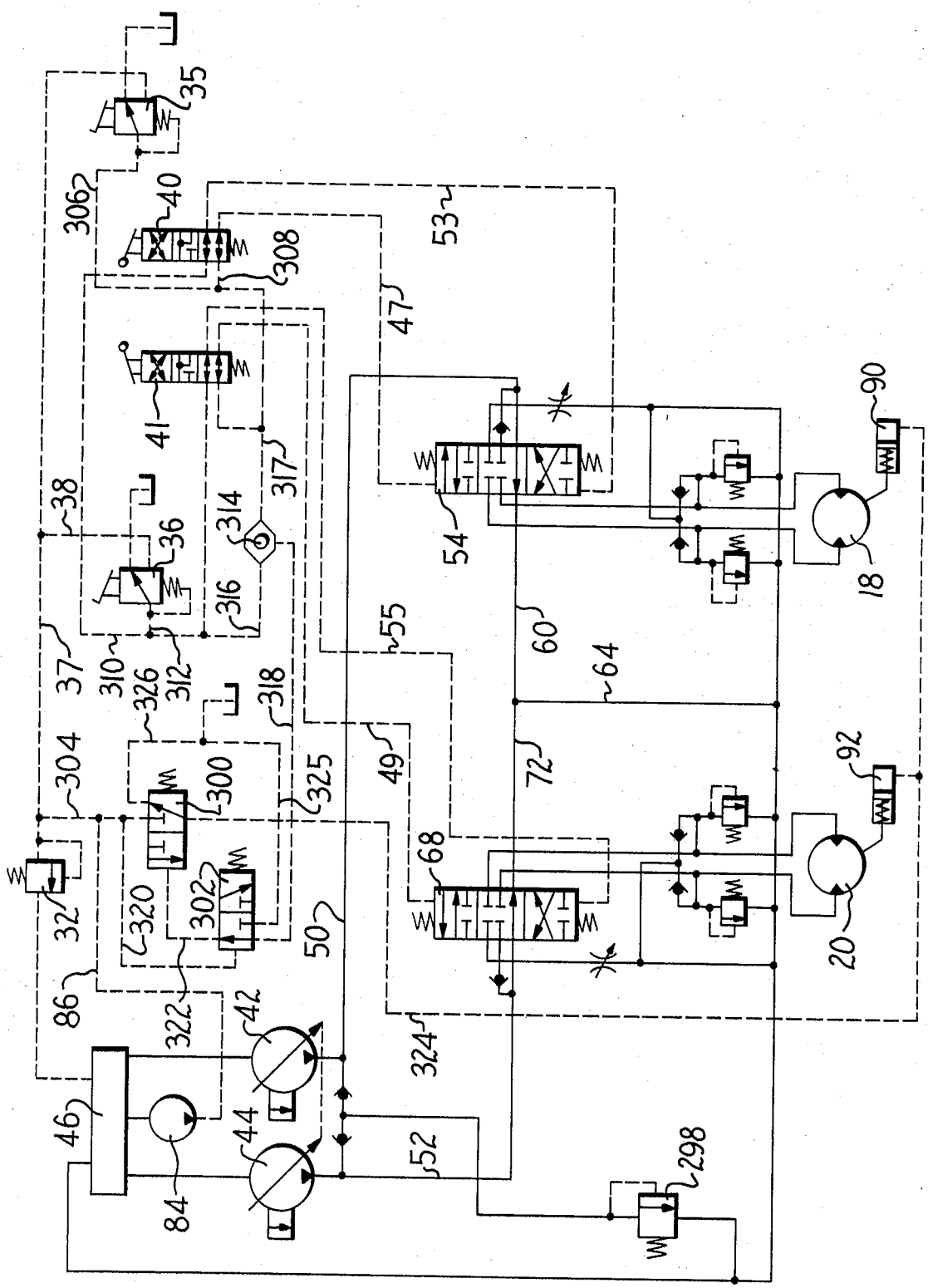

BRAKE SAVER CIRCUIT

BACKGROUND OF THE INVENTION

This description relates to a brake control circuit and pertains more particularly to a circuit that is operative to insure that the brakes of a vehicle will not be partially engaged, causing them to drag and fail.

Some vehicles employ brakes that are spring applied and fluid pressure released. This type of brake is normally employed as a parking or emergency brake. Such systems are often powered for release by hydraulic fluid from the transmission control system or similar pressurized fluid.

The present invention is contemplated for use on a hydraulic excavator. The spring applied brake system is ideal for use in an excavator because the vehicle is normally stationary when the machine is working. The brakes, however, must be applied with such pressure as to insure that the vehicle will not move while working. This requires very high pressures because of the nature of the work performed by an excavator.

When such high forces are used to apply the brakes, then even higher forces must be utilized to release the brakes. This, in many cases, may require fluid pressures considerably higher than normal control fluid pressures.

If the releasing pressure is not adequate, the brakes will drag when the vehicle is being driven from one place to another. This condition can result in an excessive wearing of the brake shoes and an early failure thereof.

It is difficult for the operator to know when the pressure is adequate to fully release the brakes since the vehicle engine is usually powerful enough to propel the vehicle with no difficulty when the brakes are lightly applied. For this reason, it is desirable to have a system that is in essence fail-safe. This means a system that is either fully actuated or fully released.

SUMMARY OF THE INVENTION

The primary object of the present invention is to provide brake control means that eliminates the above problems of the prior art.

Another object of the present invention is to provide brake control means that is operative to insure that the brakes of a vehicle are either fully applied or fully released.

A further object of the present invention is to provide a brake control system with means to prevent partial release of normally applied brakes when system pressure is not adequate for total release thereof.

In accordance with the present invention, a vehicle having brakes that are normally automatically applied when the vehicle is at rest, is provided with brake releasing control means that is responsive to control pressure inadequate to fully release the brakes to by-pass the brake releasing means.

BRIEF DESCRIPTION OF THE DRAWING

The objects and advantages of the present invention will become apparent from the following description when read in conjunction with the accompanying drawing which schematically illustrates a control system incorporating a preferred embodiment of the present invention.

DETAILED DESCRIPTION OF PREFERRED EMBODIMENT

Referring now to the drawing, the circuit of the present invention is shown in conjunction with a portion of the hydraulic circuit for a machine such as an excavator that is specifically adapted to employ the subject invention. The illustrated circuit is the propulsion control circuit wherein hydraulic motors are used to drive ground engaging translation elements such as wheels or tracks to propell the vehicle. The illustrated circuit is for a track drive vehicle and will be so described. A pilot circuit is used to actuate the control valves for the propulsion circuit. A brake releasing circuit in accordance with the present invention is incorporated in the pilot circuit to automatically release the vehicle brakes upon activation of the drive circuit if the pilot control pressure is adequate for a complete release.

As illustrated in the drawing, pumps 42 and 44 draw fluid from a reservoir 46 and supply the fluid under pressure for powering the elements of the machine by way of lines 50 and 52 to respective distributor valves 54 and 68. A relief valve 298 controls the maximum pressure in the main circuit. The pump 42 is the source of fluid for powering track driving motor 18 with distributor valve 54 operative to direct fluid thereto. Distributor valve 68 is provided for controlling the operation of track driving motor 20 with fluid supplied by pump 44. Fluid, after flowing through the open centered valves 54 and 68 without diversion for operation of the motors, passes through conduits 60 and 72 to return conduit 64 for return to reservoir 46.

A pump 84 supplies pilot fluid by way of a line 86 to a number of pilot valves for controlling or operating the main distributor control valves 54 and 68 as well as fluid for operation of the track motor brake acutating and releasing means 90 and 92. The track motor brakes are controlled by means of a pressure responsive two-position, three-way brake valve 300 and a pressure responsive two-position, three-way brake saver valve 302.

The main control valves 54 and 68 are pilot actuated by a pair of directional pilot valves 35 and 36 which are in fluid communication with the pump 84 by means of conduits 86, 304, 37 and 38 and are operative to determine the direction of rotation of the drive motors 18 and 20. A pair of steering pilot control valves 40 and 41 which are situated in the pilot control circuit between the directional pilot valves 35 and 36 and the main control valves 54 and 68 are operative to control steering of the vehicle. A relief valve 32 controls the maximum pressure in the pilot circuit.

The track drive brake actuating means 90 and 92 are operatively connected to friction brakes of any suitable conventional design and are automatically spring applied and remain applied as long as the track motor control valves 54 and 68 remain in neutral. However, upon pilot actuating of either one of these valves from neutral position when adequate pilot pressure is available, the brake valve 300 is automatically actuated to supply pilot fluid to the brake releasing means 90 and 92. Thus, the brake releasing means is normally responsive to release the brakes simultaneously with actuation of a drive control valve.

In the subject arrangement, as an example, the brakes require a minimum of 250 PSI to be released completely. However, the pilot system will function even if the supply pressure drops below 250 PSI. Thus, with the vehicle travelling under these conditions, the brakes will not be fully released, therefore they drag and fail prematurely. However, the subject brake saver circuit is operative to prevent this.

When the operator activates either of valves 35 or 36, pilot pressure is directed to pilot control valves 40 and 41 by way of conduits 306, 308, 310 and 312. Two pairs of pilot lines 49 and 55 and 47 and 53 connect control valves 41 and 40 to the main control valves 68 and 54, respectively. A three-way check or shuttle valve 314 interconnects with conduits 306 and 310 by conduits 316 and 317 to direct pilot pressure through a conduit 318 to the brake saver valve 302 regardless of which of the valves 35 or 36 is actuated.

Pressurized fluid from pump 84 is directed by way of lines 86, 304 and 320 to shift the brake saver valve 302 rightward against its spring. This permits pressurized fluid in conduit 318 from the drive and steering pilot control system portion of the circuit to be directed by conduit 322 to shift the brake valve 300 against its spring and permit pilot pressure in line 304 to be directed by conduit 324 to the brake actuating means 90 and 92, for disengaging the brakes. A pilot pressure of at least 260 PSI in conduit 320 is required to shift the brake saver valve 302 and communicate the pilot fluid pressure to shift valve 300 to provide communication of the pilot fluid to brake actuating means 90 and 92 to overcome the spring pressure and release the brakes. In the event that the pilot system supply pressure drops below 260 PSI, the brake saver valve 302 shifts leftward under influence of its spring and vents line 322 to tank via line 325. This permits valve 300 to shift to the left (to the position shown) and connects line 324 to tank by way of line 326, thus venting fluid from the releasing cylinders of the brake actuating means 90 and 92.

Thus, it can be seen from the above description that there is disclosed a brake control system that is operative in the event the pilot system supply pressure drops below the prescribed minimum to apply the brakes fully. More specifically, a brake saver valve shifts, blocking communication of pilot pressure to a brake valve, whereupon its shifts, venting brake releasing means to tank and applying the brakes fully. Thus, the brakes lock up and the machine cannot be moved until the problem is corrected.

What is claimed is:

1. A brake system for a vehicle, said brake system comprising:
   actuating means including spring means operatively connected to automatically engage said brake system;
   control means including a source of pressurized fluid operative to initiate forward and reverse drive of said vehicle and including piston means responsive to said pressurized fluid to overcome said actuating means to disengage said brake system;
   said control means further including pressure responsive valve means, operative in response to a failure of said control pressure to maintain a pre-determined minimum pressure, to by-pass said means to disengage said brake system; and,
   said valve means comprises a first valve responsive to said source of pressurized fluid to communicate fluid from said control means to shift a second valve operative to direct fluid from said source to operate said piston.

2. In a vehicle having brakes and hydraulic control means including a source of pressurized fluid operative to initiate forward and reverse drive of said vehicle, a brake control system comprising:
   means for normally biasing said brakes into an engaged position;
   brake releasing means including fluid actuated piston means operative in response to said hydraulic control means for automatically releasing said brakes upon initiation of forward or reverse drive of said vehicle;
   means including pressure responsive valve means responsive upon the failure of said pressurized fluid to maintain a pre-determined minimum pressure, to by-pass said means for releasing said brakes;
   said pressure responsive valve means comprises
   a first valve responsive to said source of pressurized fluid to communicate fluid directed by said hydraulic control means to operate a second valve; and,
   said second valve being responsive to said fluid from said control means to direct fluid from said source to said fluid actuated piston means.

3. In a vehicle having hydraulic drive means comprising a pump for supplying pressurized fluid to power a hydraulic motor operatively connected to propell said vehicle, brake means and hydraulic control means operative to initiate forward and reverse drive of said vehicle, a brake control system comprising:
   means for normally biasing said brakes into an engaged position;
   brake releasing means operative in response to said hydraulic control means for automatically releasing said brakes upon initiation of forward or reverse drive of said vehicle;
   said control means including valve means operative to control the supply of hydraulic fluid to said motor, and pilot control means to operate said valve means;
   means responsive upon the failure of said pressurized fluid to maintain a pre-determined minimum pressure to by-pass said means for releasing said brakes; and,
   said by-pass means comprising first valve means responsive to said source and second valve means responsive to said pilot control means.

4. The invention of claim 3 wherein first valve means is operative to communicate fluid from said pilot control means for operation of said second valve means; and,
   said second valve means is operative in response to the fluid from said pilot control means to direct fluid from said source to operate said brake releasing means.

* * * * *